United States Patent [19]
Morton

[11] 3,974,904
[45] Aug. 17, 1976

[54] ADJUSTABLE TRACK COVER POSITIONING ASSEMBLY

[75] Inventor: Robert D. Morton, West Hartford, Conn.

[73] Assignee: The Hartford Special Machinery Company, Simsbury, Conn.

[22] Filed: Feb. 27, 1975

[21] Appl. No.: 553,835

[52] U.S. Cl. .................................. 193/38; 72/428; 193/25 FT
[51] Int. Cl.² .................. B65G 11/00; B21D 43/16
[58] Field of Search ............... 193/2 R, 25 R, 25 E, 193/25 S, 25 FT, 38; 198/273, 282, 287; 72/428; 151/14 R, 15, 38

[56] References Cited
UNITED STATES PATENTS

| | | | |
|---|---|---|---|
| 135,809 | 2/1873 | Hubbard | 151/38 |
| 234,894 | 11/1880 | Sammis | 151/38 X |
| 1,107,213 | 8/1914 | Heinbach | 151/15 |
| 1,320,259 | 10/1919 | Martens | 151/38 |
| 1,443,992 | 2/1923 | Koski | 151/15 |
| 1,488,069 | 3/1924 | Seago | 151/15 |
| 1,538,559 | 5/1925 | Johnson | 151/38 |
| 1,971,889 | 8/1934 | Yager | 193/2 R X |
| 3,191,423 | 6/1965 | Grohoski | 72/428 |
| 3,529,706 | 9/1970 | Bru | 193/25 R X |

*Primary Examiner*—John J. Love
*Assistant Examiner*—James L. Rowland
*Attorney, Agent, or Firm*—Prutzman, Hayes, Kalb & Chilton

[57] ABSTRACT

An improved adjustable track cover assembly is provided which facilitates adjustable positioning of a track cover over a work blank feed track and which maintains the position established. The track cover assembly includes a cover supporting bracket which is operatively supported by an adjusting screw in threaded engagement therewith. The adjusting screw is supported for selective adjusting rotation relative to the cover bracket. Snubbing means, including spring means and a member in threaded engagement with the adjusting screw, coact with the bracket to impede relative rotation between the bracket and adjusting screw and thereby maintain a fixed positioning of the track cover. Additional spring means, associated with the adjusting screw support, coact with the adjusting screw to maintain a fixed positioning of the adjusting screw.

8 Claims, 4 Drawing Figures

ADJUSTABLE TRACK COVER POSITIONING ASSEMBLY

The invention relates generally to work blank forming machines and the like and, more specifically, to an improved assembly for adjustably positioning a track cover over a feed track for such machines.

It is a principal object of the invention to provide an improved track cover assembly for a feed track of a work blank forming machine wherein the time and effort required to adjust the position of the track cover overlying the feed track are greatly reduced.

Another object of the present invention is the provision of an improved track cover assembly for a feed track of a work blank forming machine wherein the track cover may be adjustably positioned over the feed track thereof with increased accuracy and simplicity.

A further object of the present invention is the provision of an improved adjustable track cover positioning assembly which may be easily installed on either new or existing work blank forming machines and that has a relatively simple but rugged construction which will provide dependable service over long periods of repeated use.

A still further object of the present invention is the provision of an adjustable track cover positioning assembly which requires moving no more than two elements thereof to effect an adjustment or change in the height or passing of a track cover relative to a feed track.

An even further object of the present invention is the provision of an adjustable track cover positioning assembly which may be readily removed from and replaced on a work blank forming machine or the like without disturbing the track cover height setting thereof.

Other objects will be in part obvious and in part pointed out more in detail hereinafter.

A better understanding of the invention will be obtained from the following detailed description and the accompanying drawings of an illustrative application of the invention.

Figure 1:
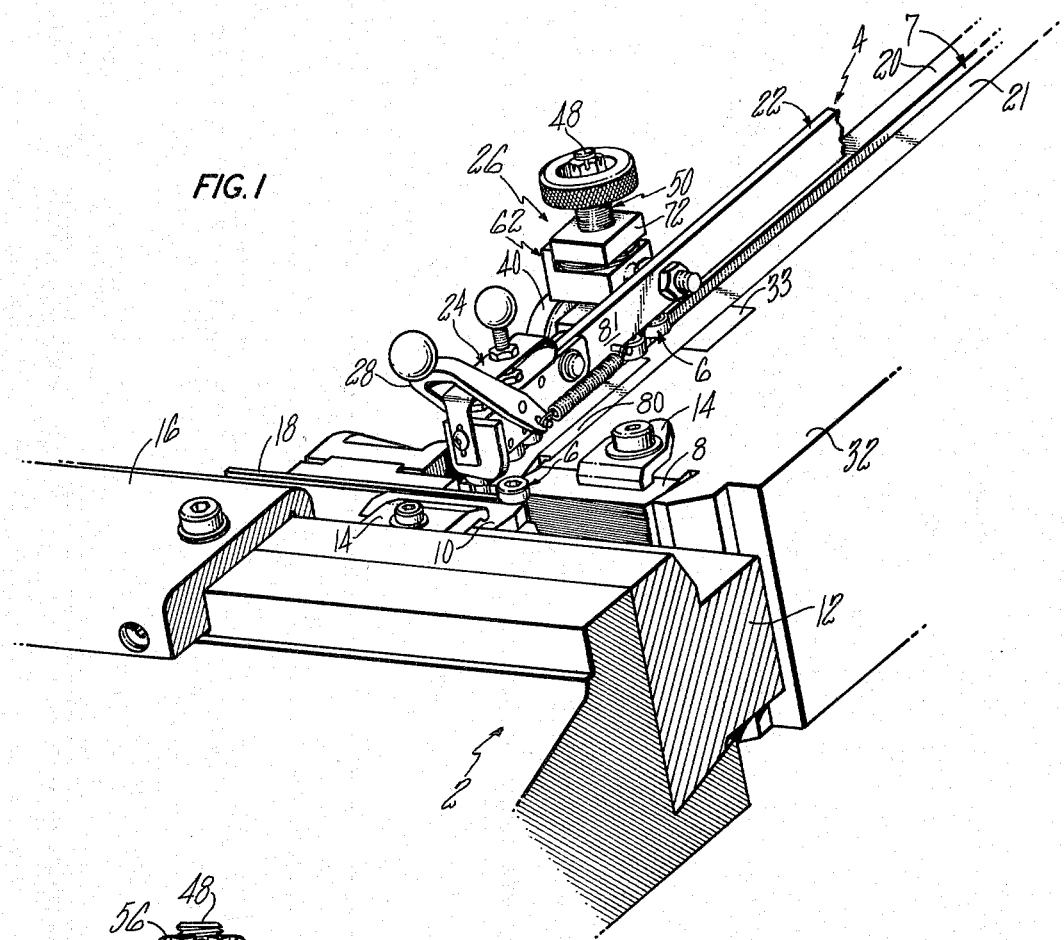
FIG. 1 is a fragmental isometric view of a thread rolling machine incorporating the adjustable track cover positioning assembly constructed in accordance with the present invention.

Referring to the drawings in detail, FIG. 1 shows for illustrative purposes, a thread rolling machine 2 of a type disclosed in U.S. Pat. No. 3,117,473 issued Jan. 14, 1964 entitled "Thread Rolling Machine" and assigned to the assignee of this invention. The machine 2 incorporates a track cover assembly generally designated 4 incorporating this invention and utilized in guiding work blanks 6 conveyed along a feed track 7 from a hopper (not shown) to a thread forming mechanism which in the illustrated embodiment includes stationary and reciprocable dies 8, 10 respectively. While the track cover assembly 4 is shown for illustrative purposes mounted on a thread rolling machine 2, it is to be understood that the invention incorporated in the track cover assembly 4 has substantial utility with other machines of the type which require track covers, such as point formers, head slotters, shank slotters and the like.

In the illustrated machine 2, the reciprocable die 10 is mounted to a slide 12 by a clamp 14 while the slide 12 is connected to a pitman, not shown, by which the slide 12 and the die 10 are reciprocated by any suitable means such as a motor and crank wheel (not shown). A combination gate and starting finger 18 is provided for controlling the discharge of the screw blanks 6 from the feed track 7 and for wedging the blanks between the dies 8, 10 at the commencement of each thread rolling operation. The feed track 7 in the illustrated machine 2 is formed by a pair of parallel rails 20, 21 spaced to receive the screw blanks 6 therebetween in the position shown in FIGS. 1 and 2 and with the head 11 of the screw blanks 6 resting on the rails 20, 21, the rails being inclined downwardly from the hopper to provide a gravity feed. For a more detailed description of the thread rolling machine 2 and its operation, reference is made to the above-mentioned patent.

The track 7 is supported near the discharge end 80 by a generally U-shaped track bracket 30 affixed to the bed 32 of the machine 2 by conventional means (not shown). Rails 20, 21 are supported on a pair of upwardly facing, laterally spaced support shoulders 34 formed intermediate the top and bottom of the inner faces of the arms 31, 33 of the U-shaped bracket 30. A lock screw 36 extends through arm 33 of bracket 30 adjacent bed 32 and into threaded engagement with rail 21 to secure rail 21 to bracket 30. A lock screw 38 extends concentrically through a central bore in a track adjusting screw 40 and into threaded engagement with rail 20. Adjusting screw 40 extends through a tapped opening in the arm 31 of bracket 30, for engaging the side surface of outer rail 20. The setting of adjusting screw 40 in bracket 30 fixes the position of the rail 20. The lock screw 38 draws rail 20 into contact with adjusting screw 40.

A slot 41 in bracket 30 extends radially outwardly from the opening through which adjusting screw 40 extends, to form a pair of jaws about the adjusting screw. A clamping screw 42 serves to clamp the jaws together sufficiently to lock adjusting screw 40 in place. Adjustment of screw 40 is made to correspond with the shank diameters of work blanks 6.

A longitudinally extending feed device or track cover assembly 4 is provided above the track 7 to cooperate therewith in guiding the work blanks 6 in proper position as they are fed along the track to the dies 8, 10. Track cover assembly 4 basically includes a fixed main track cover 22 and a movable extension cover, generally designated 24, located at the discharge end 80 of the track 7 and pivotally connected to the discharge end 81 of the main track cover 22. The extension cover 24 is movable in a plane normal to the plane of the upper surface of track rails 20, 21 between a first operative position shown in FIG. 1 wherein the covers 22, 24 present guide faces in parallel relationship to the track 7, and a second inoperative position (not shown) wherein the extension cover 24 is disposed away from the track thereby exposing several of the work blanks 6 in order to permit removal of any defective screw blanks. The track cover assembly 4 further includes a latch actuated by operating lever 28 for releasably locking the extension cover 24 in operative position. For a more detailed description of extension cover 24 and its actuating mechanism, reference is made to U.S. Pat. No. 3,191,423 issued June 29, 1965 entitled "Feeding Device For Thread Rolling Machine and the Like" and assigned to the assignee of this invention.

In such machines, the feed track cover assembly 4 is preferably adjustably supported to permit variation of its spacing with, or above, track 7 to accommodate different head thicknesses on work blanks 6. An adjustable track cover supporting and positioning assembly 26, embodying the present invention, provides the requisite track cover support and facilitates adjustment of the cover over the track. Briefly, support and positioning assembly 26 includes a bracket 62 adjustably mounted on adjusting screw 50 and in turn supporting main cover 22 of cover assembly 4. Rotation of adjusting screw 50 is effective to move bracket 62 and thereby adjust the spacing of cover assembly 4 with track 7. According to the invention, the bracket 62 and screw 50 are supported relative to one another and to track 7 by means which facilitate adjustment, insure maintenance of a particular adjustment setting against vibration and permit rapid installation and removal of the entire assembly 26 from machine 2.

Track cover assembly 4, in the illustrated embodiment, has an elongated body, generally rectangular in cross section, and is adjustably mounted by the positioning assembly 26 of the invention to extend above the track rails 20, 21 in parallel spaced relationship thereto. Preferably two positioning assemblies 26, 26' are utilized to support and position track cover 4, one (26) supported by track bracket 30, as seen in FIG. 1, and another to the rear (26', seen only in FIG. 4) supported directly by rail 20. However, both assemblies 26, 26' are identical in all respects except for base or mounting blocks 44, 44' as will be hereinafter described.

Figure 2:
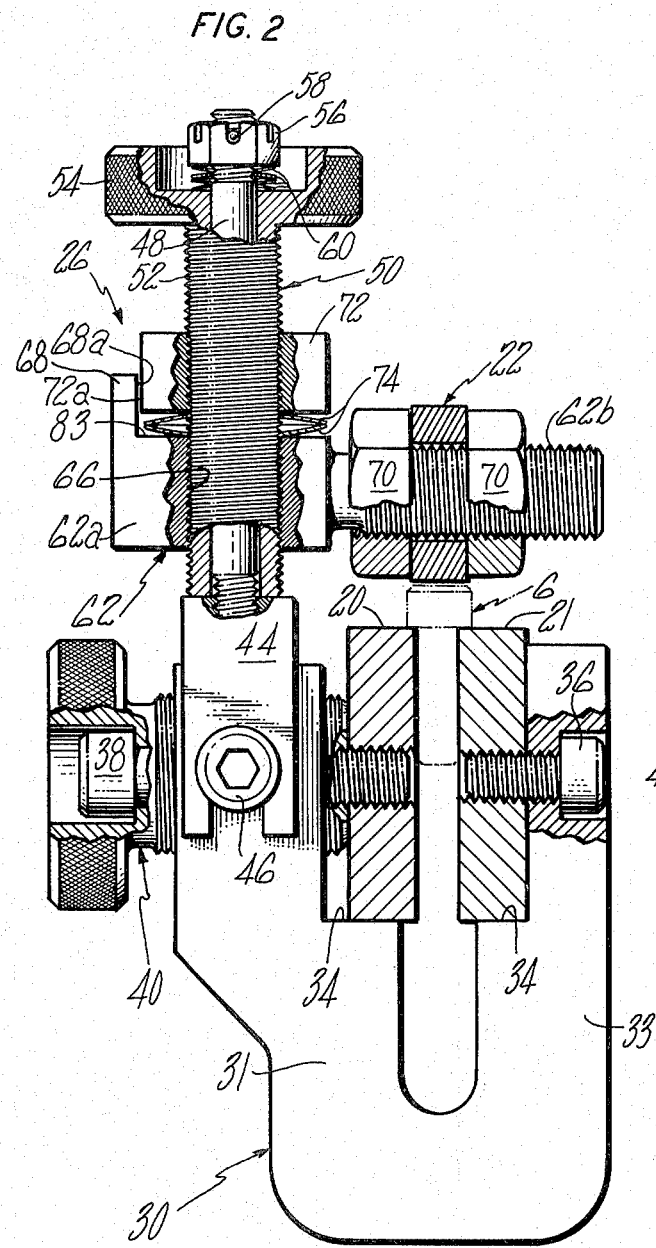
FIG. 2 is an enlarged fragmental end view of the track cover assembly appearing in FIG. 1 with portions shown in cross section.
Figure 3:
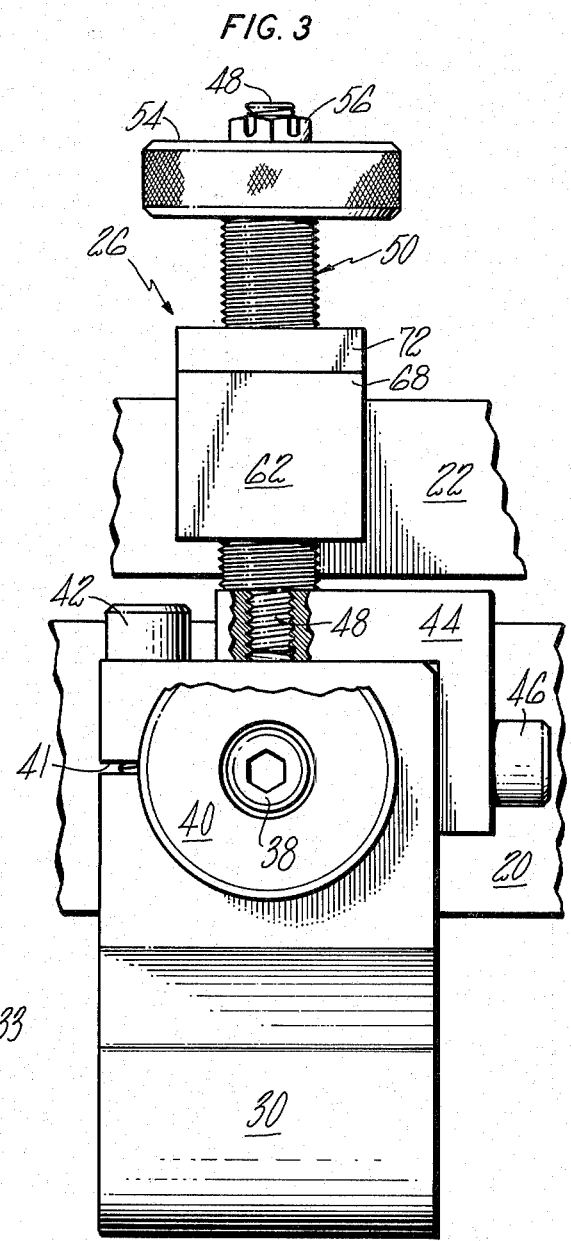
FIG. 3 is a fragmental side elevation of the assembly depicted in FIG. 2.

Referring to a more detailed description of support assembly 26 and FIGS. 2 and 3, in which the inclined track 7 is depicted as being horizontal in the interest of simplicity and clarity, a mounting block 44 may be quickly and easily affixed to and detached from track bracket 30 by means of a single mounting screw 46. Mounting block 44 comprises a rigid 90° angle iron having an upper arm supported on the upper face of arm 31 of track bracket 30 and a depending arm fastened to the forward face of the bracket arm by screw 46 extending therethrough in threaded engagement with the bracket. A tapped bore in the upper surface of block 44 extends normal to the plane of track 7 to threadably, supportingly engage the lower end of an upright support stud 48. The plane of track 7 is parallel to its longitudinal axis and extends along the upper surface of the track.

Stud 48 is coaxially received within a tubular, track cover adjusting screw 50 for relative angular and axial movement. Adjusting screw 50 has an externally threaded tubular shank 52 and an enlarged, knurled, upper thumb-wheel 54. Relative wobble between adjusting screw 50 and stud 48 is minimized by appropriate sizing of the diameters of the stud and adjusting screw. Stud 48 extends beyond the upper and lower ends of shank 52. The lower end of adjusting screw 50 is seated on the upper surface of mounting block 44.

A castellated nut 56 is releasably locked in threaded engagement with the upper end of stud 48 by a diametrically extending lock pin 58 fixed to the stud. Belleville spring washers 60 are shown conventionally stacked between thumb-wheel 54 and nut 56. In use, the stud 48 is threaded into mounting block 44 a sufficient distance for springs 60 to develop a sufficient axial force between the adjusting screw 50 and nut 56 to not only prevent undesired rotation of stud 48 relative to mounting block 44, and the adjusting screw 50 relative to the stud, but also to firmly seat the bottom of screw 50 onto the upper surface of the track support, or mounting block 44. This construction permits an operator to effect manual height adjustment of the track cover 22 without use of any tools.

A rigid track cover support bracket 62 includes a mount 62a with a projecting integral track cover support 62b. The cover support 62b comprises a threaded rod. Mount 62a of bracket 62 is radially enlarged and includes a tapped bore 66 extending through it normal to the longitudinal extent of cover support 62b. The mount 62a further includes a flat upper surface 83 surrounding and normal to bore 66 and also, an interference flange 68 extending upwardly therefrom radially outward of the bore. Bore 66 in bracket 62 is sized for threaded engagement with shank 52 of adjusting screw 50 such that rotation of the adjustment screw relative to the bracket 62 is effective to raise or lower the bracket relative to feed track 7.

The cover support 62b of bracket 62 extends outward from the mount 62a through an opening in main track cover 22. A pair of hexagonal jam nuts 70 are disposed on opposite sides of main track cover 22 in threaded engagement with rod 62b. The positioning of nuts 70 on rod 62b determines the lateral positioning of track cover assembly 4 relative to the track 7 thereat. Both nuts 70 are in snug opposing contact with track cover 22 to maintain its lateral positioning.

To maintain precise adjusted positioning of the track cover assembly 4 over feed track 7 under adverse conditions accompanying the forming or working of metal, snubbing means is provided in accordance with this invention. More specifically, a square nut 72 and a pair of Belleville spring washers 74 are provided for positively maintaining the track cover bracket 62 in a preset positioning along adjusting screw 50. Belleville springs 74 are disposed in concave facing relationship with one another between the flat upper surface 83 on mount 62a of track cover bracket 62 and the under side of nut 72. Nut 72 is in threaded engagement with adjusting screw 50 and includes a plurality of flat sides, in this instance four. The axial spacing between nut 72 and track cover bracket 62, and the design stress characteristics of the Belleville springs 74 are such that the springs develop an axial force against the nut and bracket of about 200–250 pounds, the axial loading imposed by the spring 60 being about 130–160 pounds, e.g., between the screw 50 and the nut 56. In this embodiment, the axial spacing is about 0.125 inch. It is preferable that the bore 66 in bracket 62 and the bore in nut 72 be tapped as a unit with a 0.125 inch spacer between them during the tapping operation. During assembly, the spacer is removed and springs 74 are positioned between bracket 62 and nut 72 while desired spacing is maintained by suitable clamping means, not shown, as adjusting screw 50 is threaded into assembly through the tapped holes of members 62, 72.

Interference flange 68 on track cover bracket 62 extends upwardly from the bracket 62 a distance, in this embodiment about 0.30 inch, which exceeds the axial spacing between the bracket and nut 72. Thus, with the axial spacing less than the height of the interference flange 68, it is not possible to rotate members 62 and 72 relative to each other. Flange 68 is configured and oriented to present an inwardly facing flat interference face 68a which is radially adjacent a corresponding flat interference face 72a on square nut 72 to thereby interfere with or prevent undesired rotation of nut 72 relative to bracket 62 to maintain the desired axial loading effected by springs 74. For assembly, it is simply necessary to clamp or axially compress the nut 72 and bracket 62 about springs 74 prior to their threaded engagement with adjusting screw 50.

The axial force developed between nut 72 and bracket 62 by the compression of Belleville springs 74 is sufficient to urge both into tight engagement with the threads of adjusting screw 50 and thereby prevent their rotation relative thereto, e.g., by any vibration which might normally be encountered.

Figure 4:
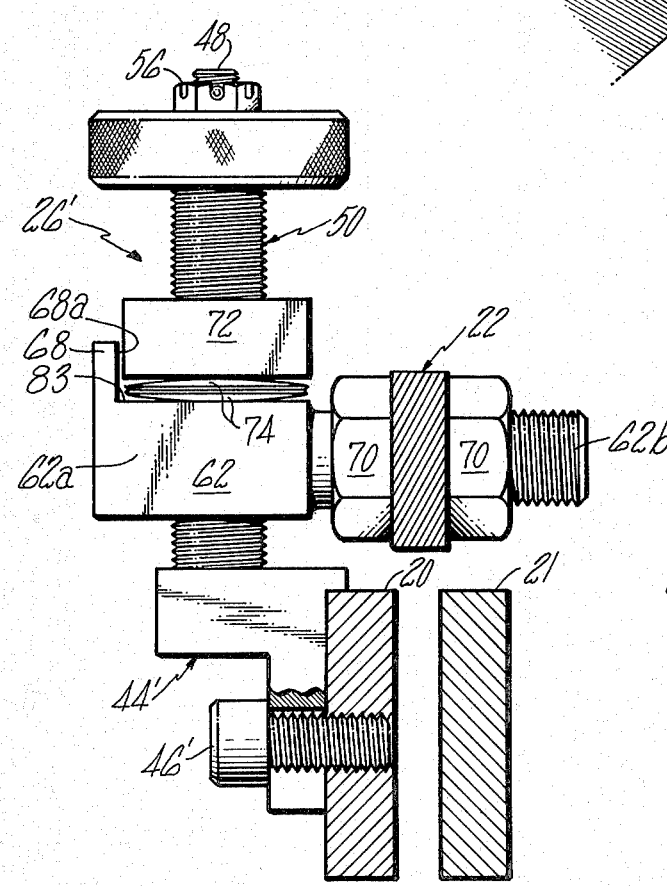
FIG. 4 is a fragmental elevational view of a track cover assembly according to the invention and located rearwardly of that depicted in FIGS. 1–3.

Referring briefly to the upstream or rear track cover positioning assembly 26', as seen in FIG. 4, the assembly is similar in all respects to that of assembly 26 with the exception that mounting block 44' is affixed in cantilever fashion directly to the outer rail 20 by a screw 46'. Mounting block 44' is a 90° angle iron supported in cantilever fashion with an upper arm extending laterally outward to provide the surface into which stud 48 is threaded. Mounting block 44' may additionally include a small support flange extending laterally inward for vertical supported engagement with the top of the outer rail 20.

Referring briefly to the operation of the adjustable track cover positioning assemblies 26, 26' of the invention, the nut 72, Belleville spring 74 and track cover bracket 62 are mounted as a unit on adjusting screw 50. Stud 48 is inserted through the central opening in shank 52 of adjusting screw 50 and into loose threaded engagement with support block 44. Track cover assembly 4 is then mounted on cover support 62b of bracket 62, using jam nuts 70, and is elevationally positioned relative to track 7 and work blanks 6 therein by rotation of adjusting screw 50 in the proper direction.

Mounting blocks 44, 44' may also be easily and rapidly detached from, or attached to, feed track 7, thereby permitting track cover assembly 4 and track cover positioning assemblies 26, 26' to be handled as a unit. This will facilitate changeover and set-up as well as aiding the operator in quickly getting malformed or defective work blanks out of the feed track 7.

As will be apparent to persons skilled in the art, various modifications, adaptations and variations of the foregoing specific disclosure can be made without departing from the teachings of this invention.

I claim:

1. For use in a machine having a feed track mounted on a track support secured to the machine for conveying work blanks wherein a track cover is provided for assisting in maintaining the positioning of the blanks, an adjustable assembly for selectively positioning the track cover in overlying relation to the track, the assembly comprising a track cover support bracket, a tubular adjusting screw, a stud extending through the adjusting screw and having a threaded end threadably engaged within an opening in the track support, the adjusting screw projecting through the track cover support bracket in threaded engagement therewith and being seated on the track support for selective height adjustment of the bracket and track cover supported thereon relative to the track upon rotating the adjusting screw in a selected angular direction, and snubbing means including a threaded member in threaded engagement with said adjusting screw and spring means between the threaded member and the bracket, the spring means urging the threaded member and the bracket in opposite directions axially of the adjusting screw to impede its rotation relative to the bracket and maintain the selected height of the track cover relative to the track.

2. A track cover positioning assembly as defined in claim 1 wherein said bracket includes a flange adjacent the threaded member, the flange and the threaded members having confronting interference surfaces to restrain rotation therebetween to maintain a predetermined loading effected by said spring means to fix the adjustment screw relative to the track support.

3. A track cover positioning assembly as defined in claim 1 wherein the stud has a second threaded end extending beyond the adjusting screw, a nut in threaded engagement on said second threaded end of the stud and releasably secured in selected position axially of the stud in spaced relation to the adjusting screw, second spring means between the nut on said stud and the adjusting screw urging them in opposite axial directions and maintaining the adjusting screw in seated engagement with the track support.

4. A track cover positioning assembly as defined in claim 3 wherein the axial spring load of the bracket snubbing spring means is greater than that of said second spring means.

5. A track cover positioning assembly as defined in claim 1 wherein said spring means comprise at least one compression spring acting axially on said bracket.

6. A track cover positioning assembly as defined in claim 5 wherein said compression spring comprises Belleville spring washer means.

7. A track cover positioning assembly as defined in claim 1 wherein said track support includes a mounting block detachably connected thereto and said adjusting screw is mounted on said mounting block.

8. In a machine having a feed track along which headed blanks are conveyed in a predetermined position and including a track cover for assisting in maintaining the positioning of the blanks, an assembly for adjustably positioning the track cover over the track comprising a mounting block detachably connected to said machine adjacent the track; a stud in threaded supported engagement with said block and extending upwardly therefrom normal to a plane including the upper surface of the track; a tubular externally threaded adjusting screw concentrically encircling said stud in relative rotational and axially movable relationship therewith, said screw being seated on said block and having its upper end below the upper end of said stud; first Belleville washer spring means encircling said stud in axially compressed contact with the upper end of said adjusting screw; a threaded head member in locked threaded engagement with the upper end of said stud to engage said first spring means and apply a predetermined axial force to said adjusting screw, thereby to urge said adjusting screw into seated engagement with said mounting block and yieldably resist relative rotation therebetween; a track cover support bracket having a cover support adapted for fixed connection to the track cover and a mount having a threaded opening therethrough in threaded engagement with said adjusting screw to adjustably position the track cover over the track, said mount including a flange having an interference surface extending longitudinally of and radially spaced from said adjusting screw; second Belleville washer spring means encircling said adjusting screw in contact with said support bracket mount adjacent said flange; and a snubbing member in threaded engagement with said adjusting screw and in axially compressive engagement with said second spring means in opposition to said bracket, said snubbing member including an interference surface in confronting relation with the interference surface on said flange to restrict relative rotation therebetween to maintain a predetermined loading effected by said second spring means to fix the adjusting screw relative to the track cover support bracket.

* * * * *